Dec. 3, 1968   H. M. WILSON   3,413,893
MACHINE TOOL
Filed April 20, 1966   4 Sheets-Sheet 2

INVENTOR
Henry M. Wilson
BY DeLio and Montgomery
ATTORNEYS

Dec. 3, 1968   H. M. WILSON   3,413,893
MACHINE TOOL
Filed April 20, 1966   4 Sheets-Sheet 3
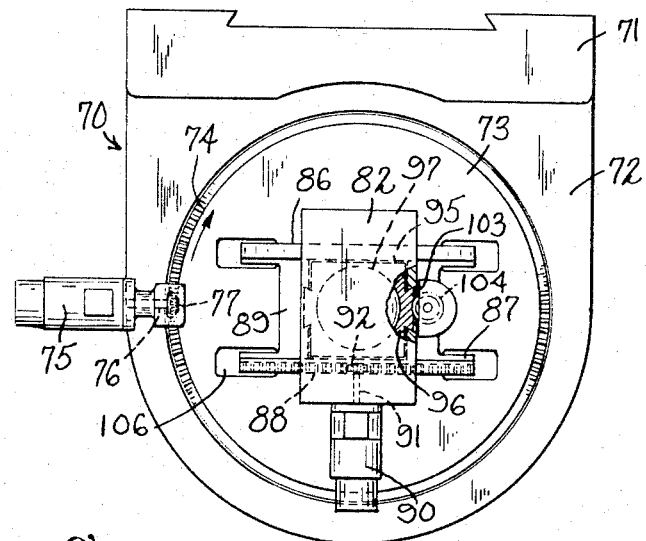
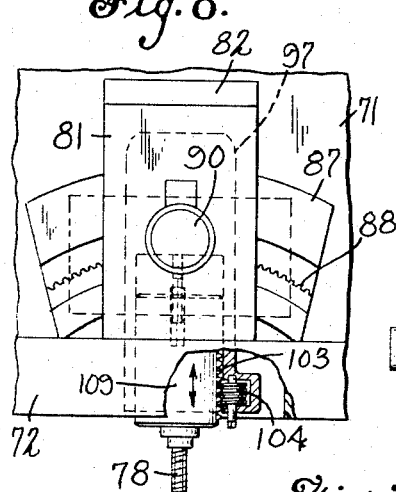
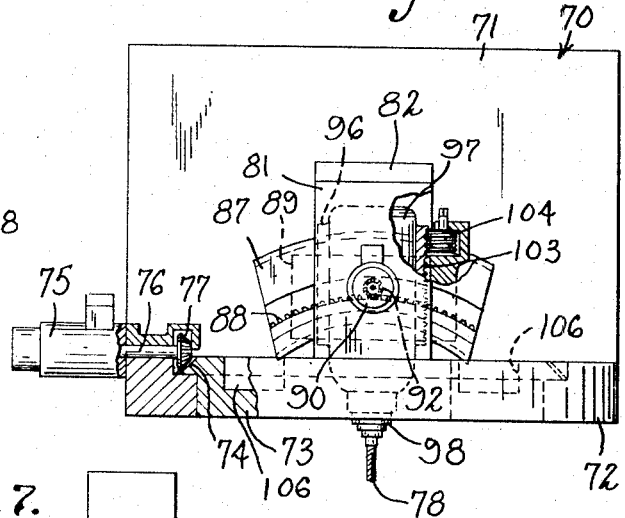
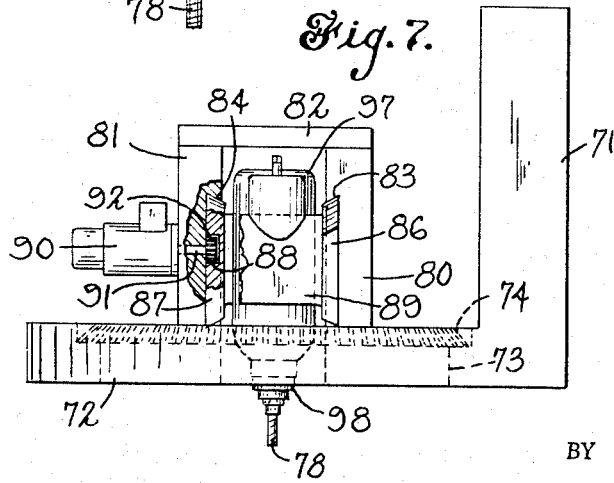
INVENTOR
Henry M. Wilson
BY DeLio and Montgomery
ATTORNEYS Dec. 3, 1968  H. M. WILSON  3,413,893
MACHINE TOOL
Filed April 20, 1966  4 Sheets-Sheet 4
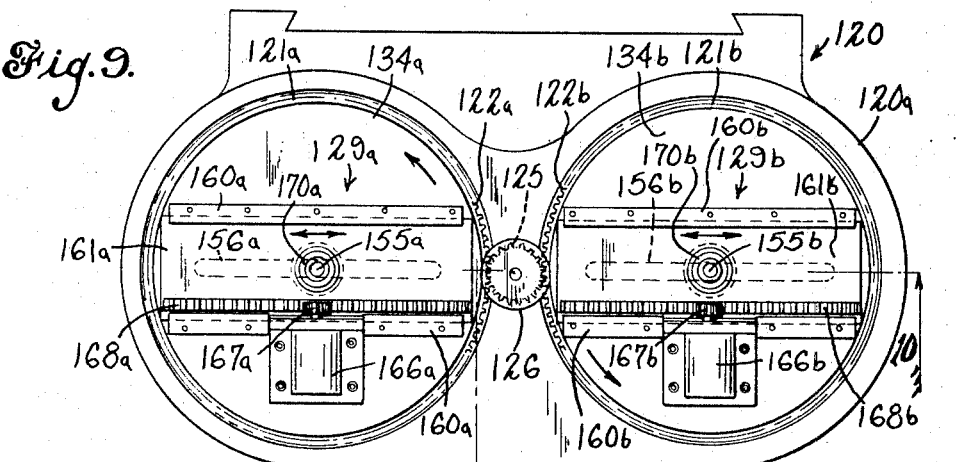
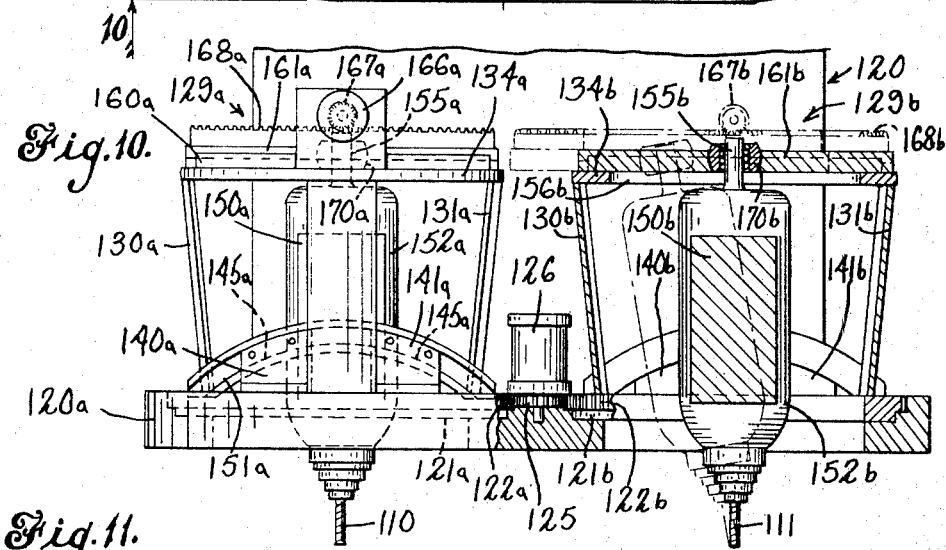
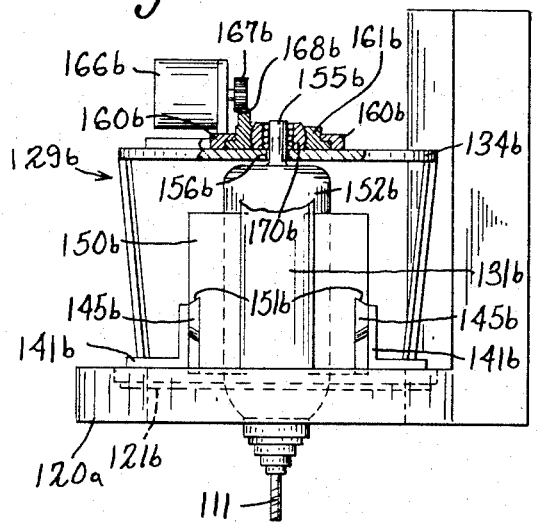
INVENTOR
Henry M. Wilson
BY De Lio and Montgomery
ATTORNEYS

United States Patent Office 3,413,893
Patented Dec. 3, 1968

3,413,893
MACHINE TOOL
Henry M. Wilson, Downey, Calif., assignor to Pratt
and Whitney Inc., Hartford, Conn., a corporation
of Delaware
Filed Apr. 20, 1966, Ser. No. 543,953
21 Claims. (Cl. 90—17)

ABSTRACT OF THE DISCLOSURE

This invention is directed to milling machines and more particularly to a tool supporting structure which can be used to perform intricate angularly related machining operations on workpieces. This particular tool holder of the tool supporting structure of this invention includes one member mounted in a second member and supported on a bearing surface thereon, the first-mentioned member having gear teeth about the outer circumference thereof and motor drive means for rotating the first-mentioned member. In addition, a rack is provided which, in combination with a second motor, is utilized to pivot the motor within the first-mentioned member. As a further improvement, there is provided a second rack in other embodiments, which is used in conjunction with a third motor for raising and lowering the tool.

---

This invention relates to machine tools such as milling machines, and more particularly to improved tool-supporting structures adapted to perform intricate angularly-related machining operations on dies and similar workpieces.

The prior art has disclosed 5-axis milling machines utilizing tool holder arrangements which are rotatable as well as pivotally positionable away from the vertica. These types of tool holder arrangements, due to their configuration, used a universal coupling or flexible coupling in order to drive the tool.

It has been found that tools driven in this manner undergo excessive wear. This has been particularly noticeable when cutting tools have been used to mill hard space-age metals such as titanium. In studying this problem it was determined that the cutting tools were undergoing pulsations as they cut, due to the manner in which they were indirectly driven.

Therefore, in order to alleviate excessive wear of the tool, it has been determined that a constant velocity drive should be provided. To accomplish this, it is preferable that the tool be driven directly from a shaft of a motor or through a gear drive which is directly coupled to the motor. At the same time, it is required that the machine remain capable of five degrees of motion to provide the flexibility required for intricate machining operations.

In view of the foregoing, applicant has invented new and improved gimbal arrangements for holding a tool, such that it may be driven directly from a motor while still permitting the tool to be moved in such a manner that intricate machining operations may be accomplished.

Accordingly, it is an object of this invention to provide new and improved mechanisms for positioning a tool to perform intricate angular movements.

Another object of this invention is to provide new and improved gimbal mechanisms which not only provide means for driving the tool directly but are also capable of being adjusted to perform intricate angular movements.

A further object of this invention is to provide new and improved tool holders which are adaptable for use in conjunction with or as part of 5-axis multiple spindle milling machines.

Still other objects and advantages of the invention will in part be obvious and will in part appear hereinafter.

The invention accordingly comprises the apparatus possessing the features, properties and relations of elements which will be exemplified in the apparatus hereinafter described and the scope of the invention will be indicated in the claims.

For a fuller understanding of the nature and objects of the invention, reference should be had to the following detailed description taken in connection with the accompanying drawings, in which the same reference numerals designate like or corresponding parts in the several views, and in which FIG. 1 is a perspective view showing a portion of a 5-axis multiple spindle milling machine;

FIG. 5 is a top view of a gimbal according to an alternate embodiment of the invention;

FIG. 6 is a front view partially in section of the alternate embodiment of the invention shown in FIG. 5; and FIG. 7 is a side view partially in section of the alternate embodiment of the invention shown in FIG. 5;

FIG. 8 is a front view of another alternate embodiment according to the invention;

FIG. 9 is a top view showing a further alternate embodiment according to the invention;

FIG. 10 is a sectional view taken along line 10—10 of FIG. 9; and

FIG. 11 is a side view of the embodiment of FIG. 9.

Figure 1:
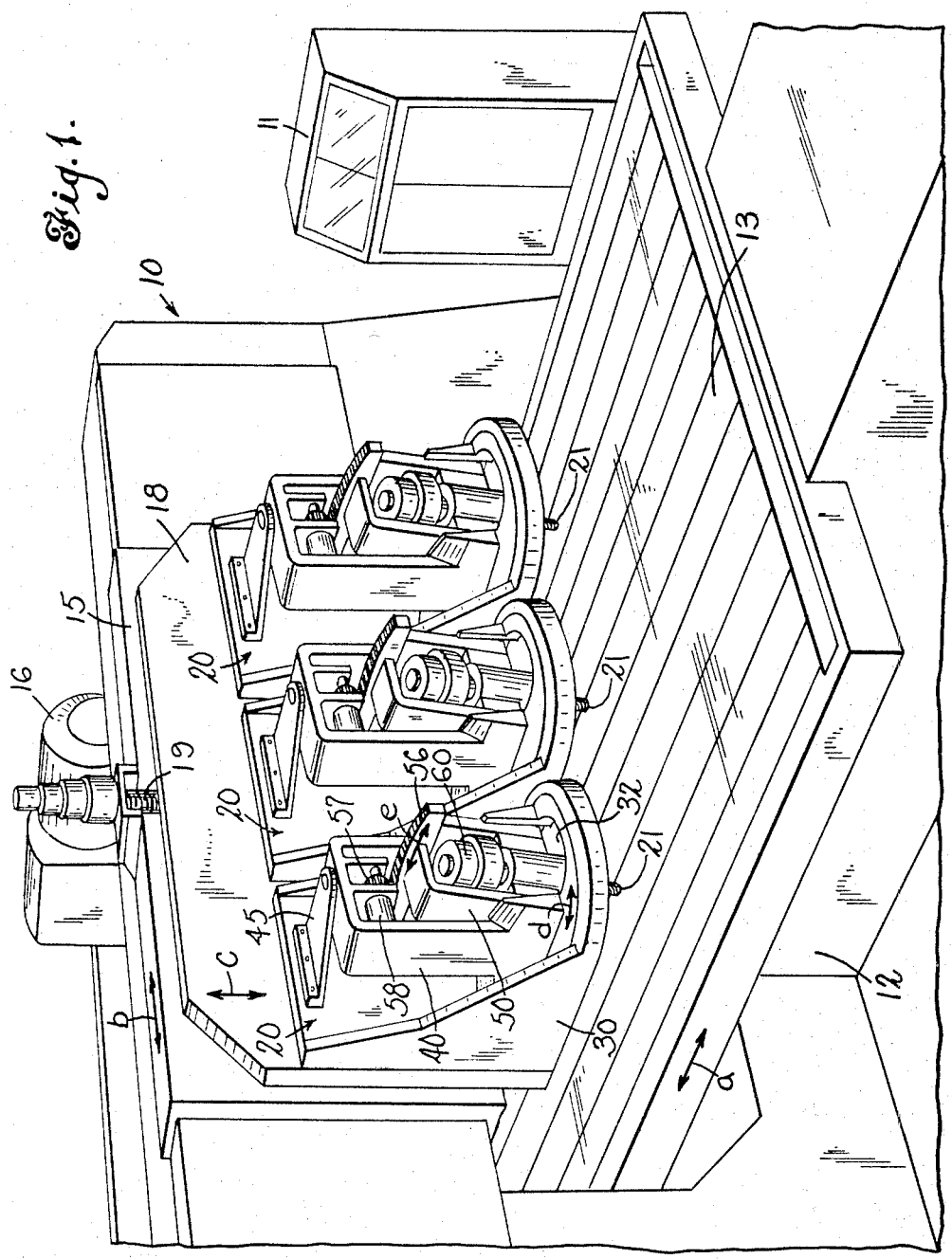

Referring to FIG. 1, there is shown at 10 a multiple spindle milling machine which may be controlled from a numerical control console 11. The milling machine 10 comprises a base 12 with a table 13 positioned thereon. The workpiece is mounted on the top of table 13 by suitable clamping means (not shown). The table 13 is movable in the directions shown by arrows $a$ by the action of a motor arrangement (not shown). On the base 12 is positioned a slidable member 15 which is movable in a direction as shown by the arrows $b$. The member 15 is positioned by a motor drive 16. There is shown coupled to member 15 a supporting plate 18 which is movable upwardly and downwardly in the directions shown by arrows $c$ by the action of a motor driven screw shaft arrangement 19. A plurality of gimbal devices 20 for supporting a plurality of spindles and tools 21, is shown mounted on the support plate 18. The gimbals include means for positioning tools 21 in the directions shown by arrows $d$ and $e$, respectively. In this manner tools 21 and the work positioned on the table 13 may be positioned in five degrees of motion, such that intricate machining operations may be performed. The movements of the tools are preferably controlled from a console 11 so that all of the tools 21 may be driven simultaneously and three workpieces may be machined simultaneously.

Figure 2:
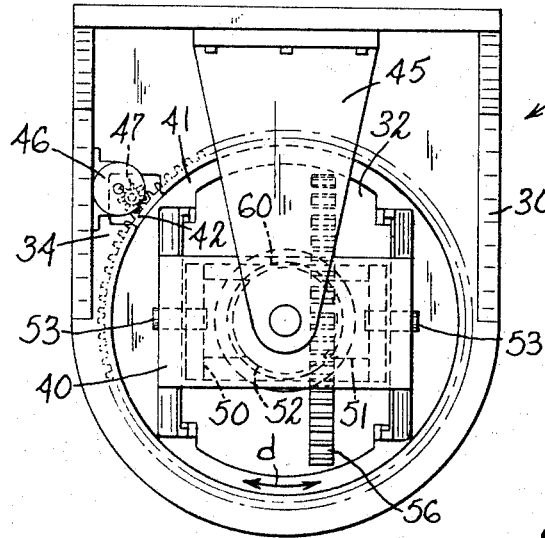
FIG. 2 is a top plan view of a gimbal according to the invention.
Figure 3:
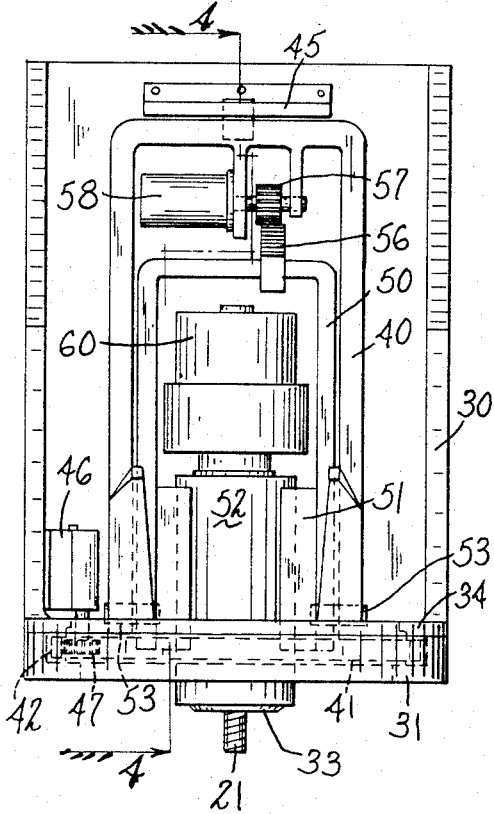
FIG. 3 is a front view of the gimbal according to the invention.
Figure 4:
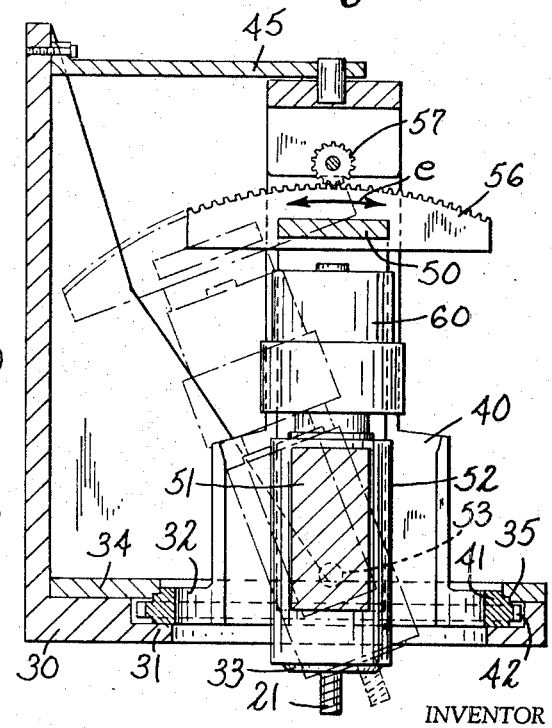
FIG. 4 is a sectional view taken along line 4—4 of FIG. 3.

Referring now to FIGS. 2–4, there is shown in more detail the gimbal arrangement 20 of FIG. 1. The gimbal 20 comprises a base supporting member 30 with a bearing portion 31 formed therein and a cut-out portion 32 to permit tool 21 and spindle 33 to extend downwardly therethrough. Also positioned on the base support member 30 is a plate 34 which forms a way 35 between bearing portion 31 of the base support member and the plate. Supported by bearing portion 31 is a U-shaped member 40 having a bearing 41 with gear teeth 42 formed on the outer periphery thereof. The bearing 41 and the associated gear teeth 42 are positioned in way 35 such that the U-shaped member 40 may be rotated within the base support member 30 as shown by the arrows $d$. The U-shaped member is additionally supported at its topmost portion by a member 45 extending from the base support member 30 so that the member 40 will not tilt as it is rotated. To rotate member 40 there is provided a motor 46 with a gear 47 mounted on the shaft thereof. The shaft of gear 47 mates with gear teeth 42 such that the U-shaped member 40 may be rotated in a direction shown by arrows d.

Positioned within the U-shaped member 40 is another substantially U-shaped member 50 which includes support means 51 for supporting the outside casing 52 of a spindle holder. Positioned within the spindle holder 52 is the spindle 33 previously mentioned. The U-shaped member 50 is supported within member 40 by a plurality of pivot pins shown at 53. To pivotally move member 50 there is provided a rack 56 which is driven by a gear 57 mounted on a shaft of a motor 58 which is in turn supported by the member 40. In this manner the member 40 as well as the tool and the spindle which it supports may be positioned as shown by the arrows e. To drive the spindle 33 and the tool 21 mounted therein, there is provided a motor 60 preferably of the pancake type, which is mounted within a portion of the member 50 and on the spindle holder 52. Thus the spindle 33 and the tool 21 may be driven directly from the motor shaft. Additionally, if desired, a gear arrangement such as a planetary drive, may be interspersed between the shaft of the motor and the spindle. Thus there is provided a gimbal arrangement capable of positioning the tool in two degrees of motion as well as providing means for permitting the spindle to be driven directly from the motor. As can be seen, the tool holder casing 52 and the spindle 33 extend through a plane of the bearing 41.

Referring now to FIGS. 5-7, there is disclosed an alternate embodiment of a gimbal according to this invention. The gimbal is generally shown at 70 and includes a back plate 71 for mounting it to a milling machine. The gimbal 70 also includes a base plate 72 coupled to the member 71 for holding a rotatable supporting plate 73. The plate 73 includes an outer gear ring 74 formed thereon. The plate 73 is rotated by the action of a motor 75 supported on the plaate 72 having a shaft 76 with a bevel gear 77 mounted thereon. The gear 77 mates with the ring gear 74 to effect rotation of plate 73 to thereby rotate the tool shown at 78. Positioned on plate 73 is a supporting member comprising side members 80 and 81 and a top member 82 coupled therebetween. Formed within side members 80 and 81 are ways 83 and 84 respectively. Positioned within these ways are two members 86 and 87 respectively. The member 86 is provided with gear segment 88 along one side thereof and members 86 and 87 are coupled together by a member 89 positioned therebetween. In order to pivot members 86 and 87, a motor 90 is mounted on the side member 80 such that a shaft 91 of the motor may drive a gear 92 to drive the gear segment 88 mounted on member 86. The member 89 is provided with a cut-out portion, shown at 95, for positioning a motor holder 96 therein to securely retain a motor 97 having means shown at 98 for holding the tool 78.

As an additional feature of this invention, the member 96 includes a rack arrangement 103 positioned on one side thereof. By the provision of a worm gear 104 mounted on the member 89, the motor 97 may be raised and lowered. To permit the motor to pivot, the plate 73 is provided with openings, shown at 106, so that members 86 and 87 may be positioned at their ends below the plane of plate 73. Thus, as shown in FIGS. 5-7, there is provided means for positioning a tool in three directions, that is, the tool may be rotated, may be pivoted and may be raised and lowered, by the action of three sets of gears, each driven independently, as shown in the drawings.

Referring now to FIG. 8, there is shown an alternate embodiment of the embodiments of FIGS. 5-7. In this case, instead of the tool being driven in a vertical direction by the action of a gear positioned as shown in FIG. 6, the gear and rack arrangement is positioned in the plane of the rotatable plate 73. As such, a quill 109 is raised or lowered by the gear 104 to effect position of the tool 78.

In FIGS. 9-11, there is shown another embodiment of a gimbal arrangement for rotating two tools 110 and 111 simultaneously. The gimbal arrangement is generally shown at 120 and includes a base member 120a and rotatable plates 121a and 121b respectively mounted therein, each of which is provided with gears 122a and 122b respectively, formed along an edge thereof such that a single gear 125 driven by a motor 126 may rotate both of the plates simultaneously.

Positioned on each of plates 121a and 121b are housings 129a and 129b comprising side members 130a and 130b, and 131a and 131b respectively, and top plate members 134a and 134b respectively. Mounted on base member 120a are bracket supports 140a and 140b, and 141a and 141b respectively, which support guides shown at 145a and 145b. Mounted on these guides are motor support means 150a and 150b, respectively, having cutout ways 151a and 151b respectively formed therein. The support means 150a and 150b support motors shown at 152a and 152b respectively, which are mounted for holding the tools 110 and 111. The tops of the casings for motors 152a and 152b include pin members 155a and 155b which slide within slots 156a and 156b formed in plates 134a and 134b, respectively. In order to pivot the motors, there are provided for each of the tool holders shown, a plurality of ways 160a and 160b for guiding slide plates 161a and 161b therein. The slide plates are positioned by the action of motors 166a and 166b mounted on plates 134a and 134b, respectively. The motors 166a and 166b include shafts having gears 167a and 167b which mate with gear teeth 168a and 168b formed in the slide plates 161a and 161b, respectively. To permit pivoting of motors 152a and 152b there are provided bearings 170a and 170b, respectively, which are pivotally mounted within a portion of the slide plates 161a and 161b. By movement of the slides 161a and 161b, the bearings 170a and 170b will pivot and will therefore cause motors 152a and 152b to pivot at the same time.

It will thus be seen that the objects set forth above, among those made apparent from the preceding description, are efficiently attained and since certain changes may be made in carrying out the above constructions set forth without departing from the scope of the invention, it is intended that all matter contained in the foregoing description and shown in the accompanying drawings shall be interpreted as illustrative and not in a limiting sense.

It is also to be understood that the following claims are intended to cover all of the generic and specific features of the invention herein described and all staatements of the scope of the invention which, as a matter of language, might be said to fall therebetween.

What is claimed is:

1. A machine tool, comprising a work supporting structure and a tool supporting structure positioned for relative movement with respect to said work supporting structure, said tool supporting structure including a gimbal arrangement for supporting a spindle, comprising a base member formed with a cutout therein surrounding at least a portion of the spindle, a first member supported by said base member by a bearing portion formed about the cutout, said first member surrounding at least a portion of the spindle and having a bearing with gear teeth formed about the outer circumference thereof, said first member mounted for rotation within said base member and said bearing of said first member engaging and supported by said bearing portion of said base member, a second member surrounding at least a portion of the spindle and having support means for holding the spindle, said second member provided with a rack and said second member pivotally supported by said first member for pivotal movement within said first member, and a motor supported by the base member for rotating said gear teeth.

2. A machine tool according to claim 1, wherein said second member spindle support means passes through the plane of said first member bearing.

3. A machine tool according to claim 2, wherein a means supported by said first member is provided to drive said rack.

4. A machine tool according to claim 1, wherein said base member bearing portion includes a way for receiving said first member bearing, said way surrounding the gear teeth of said first member bearing.

5. A machine tool according to claim 1, wherein a member coupled to said base member is provided, said last-mentioned member including means for pivotally supporting said first member at its end furthest its bearing.

6. A machine tool in accordance with claim 1, including spindle drive means positioned within the confines of said second member and pivotally movable therewith.

7. A machine tool in accordance with claim 1, wherein said second member is pivotally supported by said first member closely adjacent said bearing of said first member and wherein said rack is mounted on said second member at a greater distance from said bearing of said first member than the distance of said pivot point of said second member from said same bearing.

8. A machine tool in accordance with claim 1, wherein the spindle and the spindle support means extend through the plane of said first member bearing.

9. A machine tool, comprising a work supporting structure and a tool supporting structure positioned for relative movement with respect to said work supporting structure, said tool supporting structure including a gimbal arrangement for supporting a spindle, comprising a base member having a bearing portion surrounding a cutout portion formed therein, a plate having a cutout therein, said plate supported by said bearing portion for rotation and said plate having gear teeth around the circumference thereof, means mounted on said base member for rotating said plate, first support means mounted on said plate and having guide means formed therein, second support means having ways positioned in said guide means and said second support means having a rack positioned thereon, and means supported by said first support means for pivoting said rack and second support means in said guide means.

10. A machine tool according to claim 9, including a guide formed in said second support means, a way mounted in said last-mentioned guide, said way provided with means for supporting a motor, gear means provided on said way and means supported by said second support means for positioning and moving said last-mentioned way in said guide formed in said second support means.

11. A machine tool, comprising a work supporting structure and a tool supporting structure positioned for relative movement with respect to said work supporting structure, said tool supporting structure including a gimbal arrangement for supporting a spindle, comprising a base member having a bearing portion surrounding a cutout formed therein, a plate having a cutout therein, said plate mounted for rotation on said bearing portion, first and second members mounted on said plate about said cutout, a third member supported by said first and second members, said third member having a cutout slot formed therein, curvilinear guides mounted on said plate, a motor holder having guideways, said guideways mounted on said guides such that said motor holder is adapted to pivot, a motor casing mounted in said motor holder, said casing having a pin extending therefrom and said pin extending through said slot, ways supported by said third member, a slide plate slidably mounted in said last-mentioned way, and a bearing mounted about said pin and positioned in said slide plate.

12. A machine tool according to claim 11, including gear means provided on said slide plate to permit said plate to be slidably moved.

13. A machine tool according to claim 11, wherein the base member includes a second bearing portion surrounding a second cutout formed therein, a second plate mounted for rotation in said bearing portion, and means mounted on said base member for simultaneously rotating said two plates supported in said bearing portions.

14. A machine tool, comprising a work supporting structure and a tool supporting structure positioned for relative movement with respect to said work supporting structure, said tool supporting structure including a mechanism for pivoting a tool holder, comprising a plate having a cutout therein, side members positioned about the cutout and having guides formed therein, a holder member having curvilinear ways thereon, said ways mounted for slidable movement in said guides, and a rack recess mounted within said holder member, and a motor supported by one of the side members and having drive means passing through an opening formed within the side member to drive said recess mounted rack.

15. A machine tool according to claim 14, wherein said rack is formed from a portion of one of said ways.

16. A machine tool according to claim 14, wherein said holder member includes a guide formed therein and a second way mounted for slidable movement in said last-mentioned guide.

17. A machine tool according to claim 16, wherein said second way includes a second rack.

18. A machine tool according to claim 14, including means for raising and lowering the tool holder.

19. A machine tool according to claim 14, wherein the tool holder comprises a motor and a quill and wherein means are included for raising and lowering the quill.

20. A machine tool, comprising a work supporting structure and a tool supporting structure positioned for relative movement with respect to said work supporting structure, said tool supporting structure including a mechanism for pivoting a tool holder, comprising a plate having a cutout portion therein, first guides mounted on said plate about said cutout portion, side support members mounted on said plate about said cutout portion, a top support member mounted on said side support members, said top support member having a slot therein, tool holder means having a pin extending therefrom and first ways for engaging said first guides, said pin extending into said slot, second guides mounted on said top member about said slot, a plate slidably mounted on said top member and positioned by said second guides, said slide plate having a bearing mounted therein for rotatable motion, and said bearing mounted on said pin.

21. A machine tool according to claim 20, including a rack provided on said slide plate.

References Cited

UNITED STATES PATENTS 2,895,386 7/1959 Mann _____ 90—13
3,013,473 12/1961 Straus _____ 90—17

FRANCIS S. HUSAR, *Primary Examiner.*